United States Patent
Piatek et al.

[15] 3,699,828
[45] Oct. 24, 1972

[54] PIPE GROOVER
[72] Inventors: Edward Walter Piatek, Linden; William A. Horr, Hamburg, both of N.J.
[73] Assignee: Victaulic Company of America, South Plainfield, N.J.
[22] Filed: Dec. 2, 1970
[21] Appl. No.: 94,294

[52] U.S. Cl. ................82/4 C, 90/12 D, 144/205
[51] Int. Cl. ...............................................B23b 5/16
[58] Field of Search............82/4 C; 90/12 D; 144/205

[56] References Cited

UNITED STATES PATENTS

| 2,842,238 | 7/1958 | Shaw et al. | 82/4 C |
| 2,753,739 | 7/1956 | Dreier | 82/4 C |
| 3,067,651 | 12/1962 | Hogden et al. | 144/205 X |
| 2,837,973 | 6/1958 | Dunlap | 90/12 |

FOREIGN PATENTS OR APPLICATIONS

| 719,934 | 11/1931 | France | 90/12 |

Primary Examiner—Leonidas Vlachos
Attorney—Albert M. Parker

[57] ABSTRACT

A portable tool for machining pipe, particularly suited for forming an external circumferential groove adjacent the end of a plastic pipe section. A motor driven cutter is held pointed toward the axis of the pipe by guide and support rollers which are mounted on adjustable arms adapted to engage pipes of different diameters. One rotation of 360° suffices to produce a completed groove.

12 Claims, 9 Drawing Figures

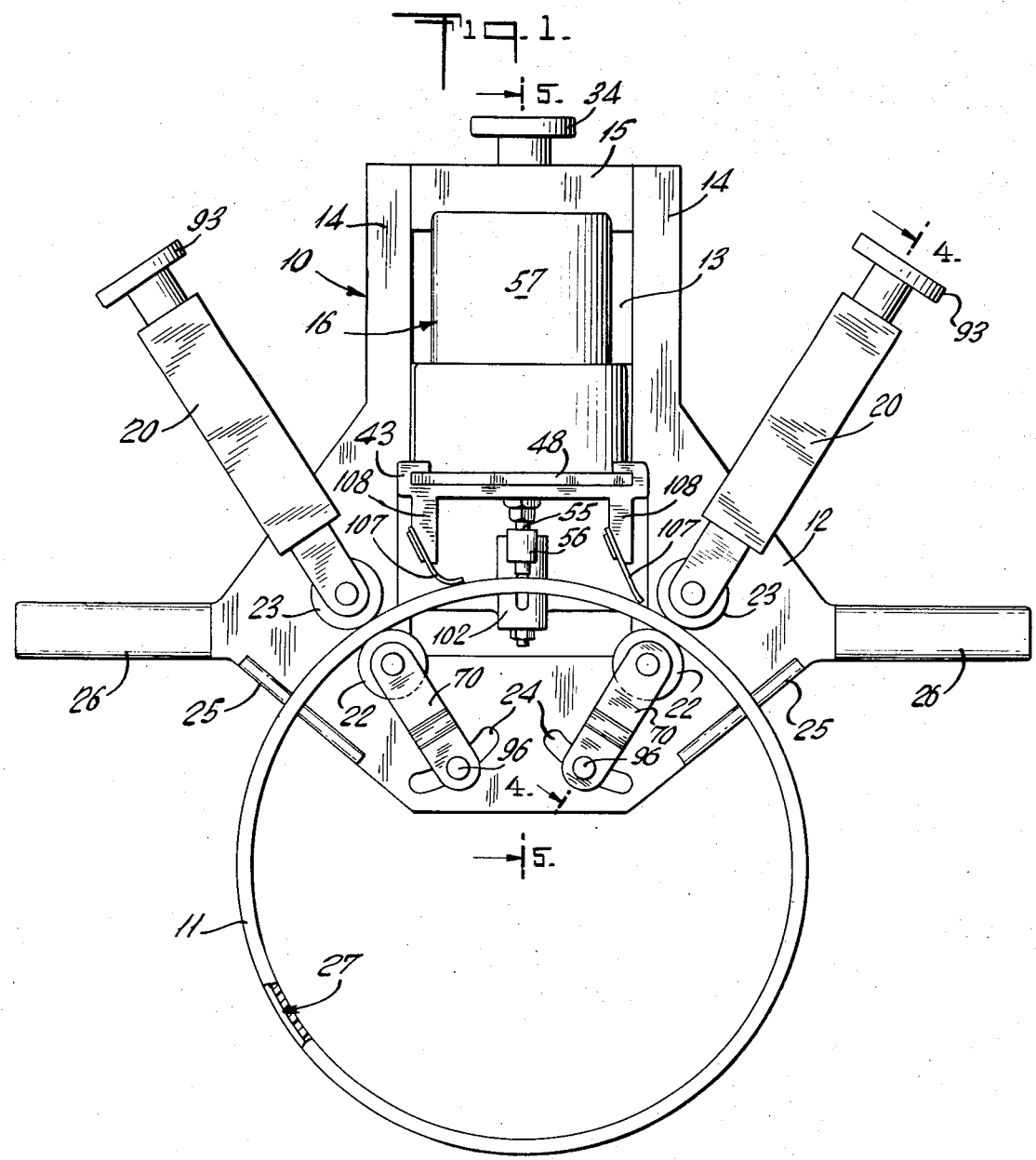

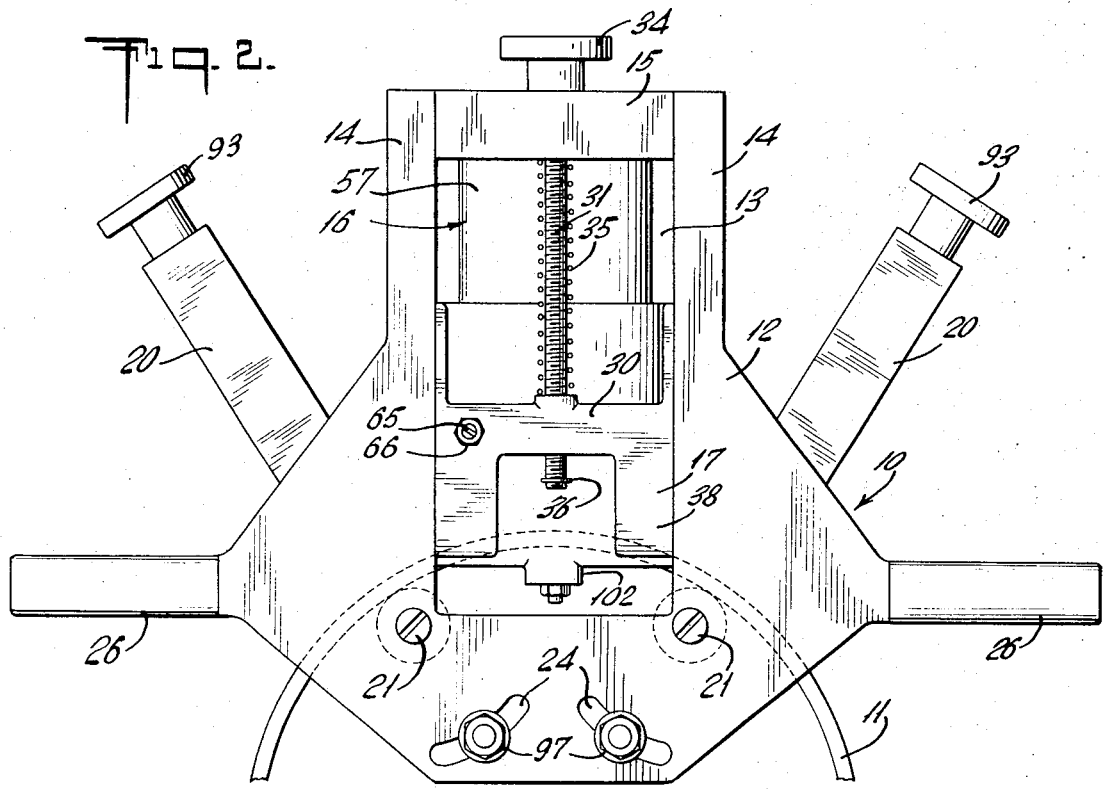
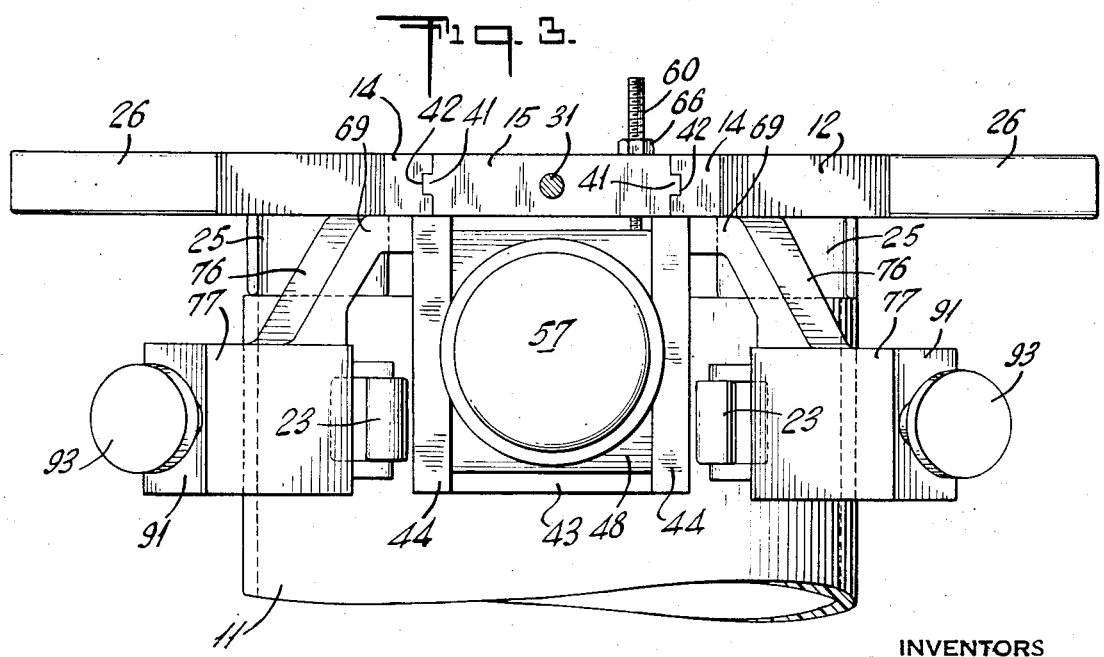

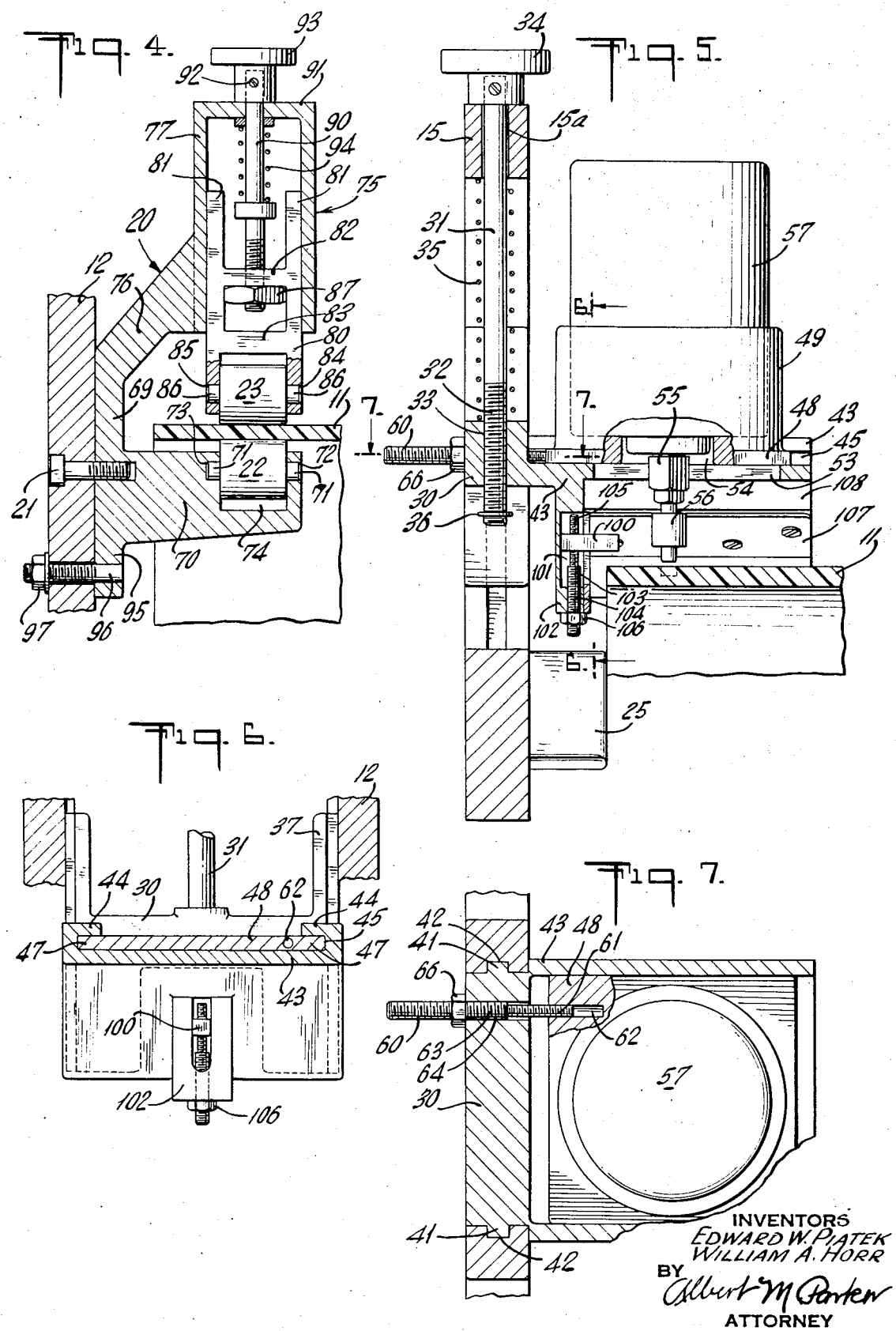

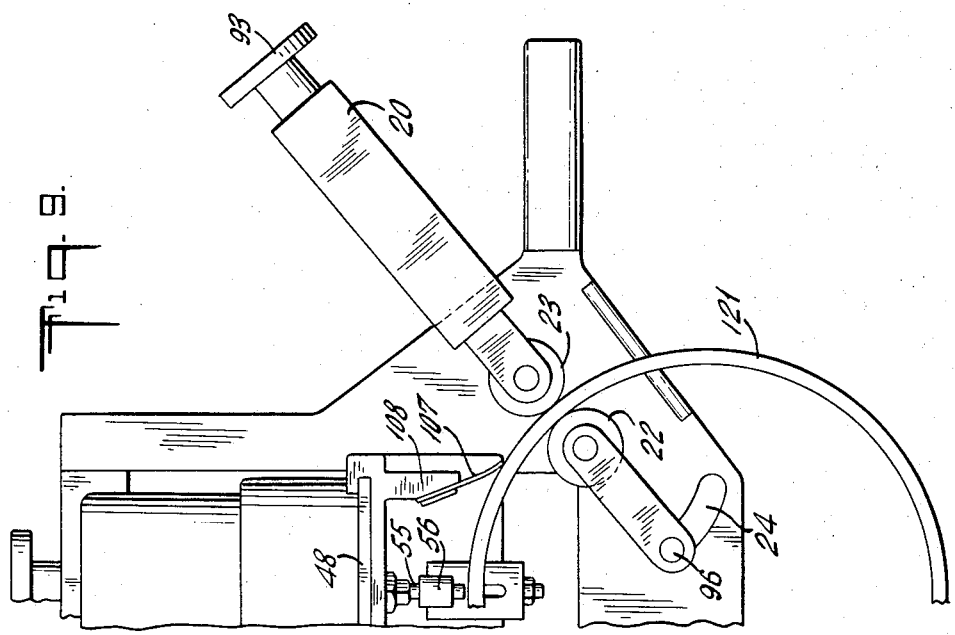
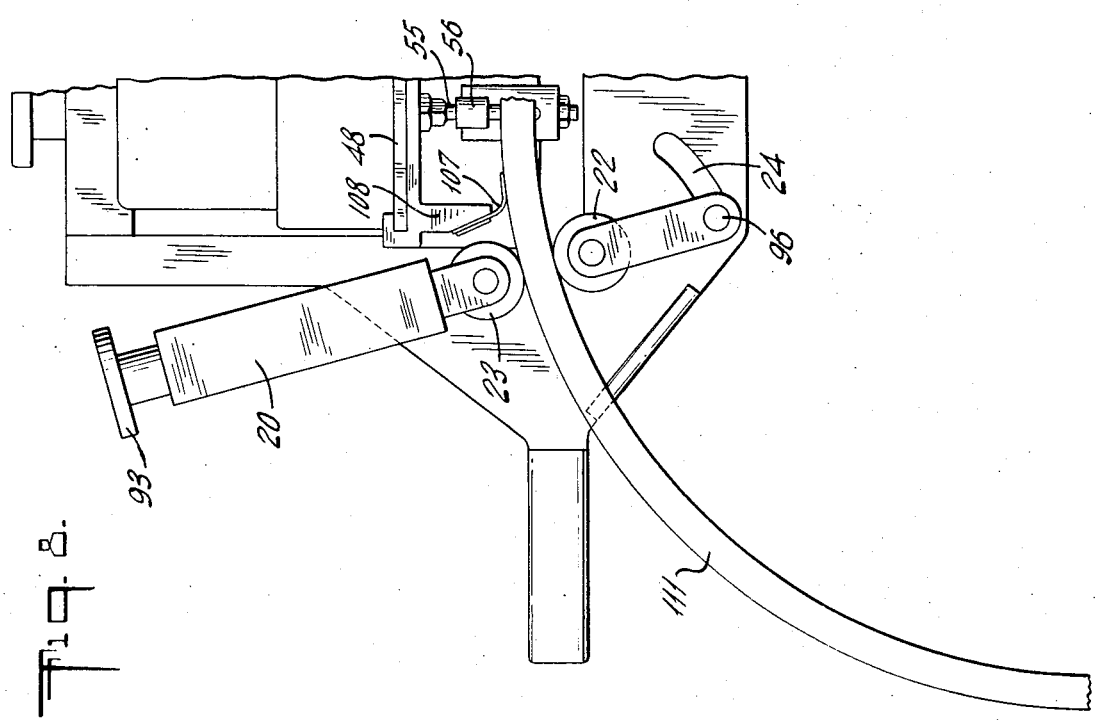

PIPE GROOVER

BACKGROUND OF THE INVENTION

1. Field of the Invention

This invention relates to the machining of pipes, and more particularly to a tool for quickly cutting external circumferential grooves adjacent the ends of plastic pipe sections.

2. Description of the Prior Art

Pipes formed with grooves near their ends are in wide use because sections of such pipe can be quickly and easily joined end to end by means of fluid-tight couplings of various known types. In such installations, sealing elements of the couplings seat against and cooperate with the grooves of adjacent pipe sections to form joints which become tighter when internal pressure upon the pipes increases. Conduit systems of such pipes are often used for temporary as well as permanent installations.

Grooved pipes of many sizes, and formed of various materials are now in use, but pipes of synthetic plastics materials have become increasingly attractive because of the low cost and other advantages plastic pipes exhibit in comparison with metal pipes in numerous applications.

Tools of various types have been used for forming a circumferential groove in the periphery of pipe. Such tools include modified "square and pipe cutters," which are usually quite inaccurate and difficult to use in the field, as well as tools especially designed for the purpose. An example of a hand tool for accurately cutting a groove in a pipe surface is disclosed in U.S. Pat. No. 2,634,643 to Krooss, showing a rachet action manually operated device which cuts a groove as it is revolved a number of times around a pipe.

A motor driven pipe cutter is disclosed in U.S. Pat. No. 3,247,743 to Frost et al. The tool of Frost et al. includes a serrated roller which is introduced inside a pipe to be cut so that teeth of the roller abut against the inside wall of the pipe in positive driving engagement, and has various adjustable supporting and guiding devices which are arranged to hold firmly and tightly enough that a heavy metal pipe may be cut.

Although various tools have been used in the past for grooving pipe, no completely satisfactory portable power tool for grooving plastic pipe has been provided until the present invention.

SUMMARY OF THE INVENTION

The pipe groover of the invention comprises a generally flat tool body which is positioned adjacent the end of a pipe into which a groove is to be cut. Mounted on a spring loaded platform on the tool body are a high speed motor with a cutter, and a depth stop for assuring that the groove has a uniform depth. The depth stop is adjustable positioned by a compound threaded screw.

A pair of self-centering pivoted arms, carrying guide and support rollers for engaging the inner and outer walls of a pipe, serve to keep the cutter pointed toward the axis of the pipe. The arms are adjustable for pipes of different diameters.

The tool body has several fixed positioned end stops for abutment against the pipe end. The distance of the groove from the end plane of the pipe is established by moving the motor and cutter along a slide in the spring loaded platform by means of a compound threaded screw, which makes fine adjustment of this dimension easy.

The tool is readily rotated by hand around the end of the pipe into which a groove is to be cut. Handles are provided on the tool body for the operator. One rotation of the tool cuts the complete circumferential groove.

Accordingly, it is an object of the invention to provide a portable power tool for forming an external circumferential groove in a pipe.

Another object is to provide a simple and easily adjustable pipe grooving tool which will accurately cut annular grooves in pipes of different diameters.

A further object is the provision of a pipe grooving tool which will rapidly cut a circumferential groove in a plastic pipe in a single pass around the pipe.

These and other objects and novel advantages of the tool of the invention will appear more fully from the following detailed description taken in conjunction with the accompanying drawings.

BRIEF DESCRIPTION OF THE DRAWING

FIG. 1 is a front view of a preferred embodiment of the tool of the invention, showing a pipe in position for grooving.

FIG. 2 is a back view of the tool of FIG. 1, with a hidden portion of the pipe indicated by shadow lines.

FIG. 3 is a top view of the tool of FIG. 1.

FIG. 4 is a detail view of the invention, in section, taken along line 4—4 of FIG. 1 and looking in the direction of the arrows.

FIG. 5 is a view in section taken along line 5—5 of FIG. 1 and looking in the direction of the arrows, parts being cut away to show internal structure.

FIG. 6 is a detail view, in section, taken along line 6—6 of FIG. 5.

FIG. 7 is a detail view, in section, taken along line 7—7 of FIG. 5 partly cut away to show internal structure.

FIG. 8 is a partial view similar to FIG. 1 showing the position of an arm of the tool when a pipe of large diameter is grooved.

FIG. 9 is a view similar to that of FIG. 8, showing the grooving of a pipe of small diameter.

DESCRIPTION OF A PREFERRED EMBODIMENT

Reference is made to FIG. 1, showing a front view of the tool generally indicated by the reference number 10, with a pipe 11 in position for machining to groove therein. The tool 10 has a sturdy frame or body 12, upon which the working elements are mounted. The tool body 12 is generally of an inverted yoke shape, with a central channel 13 defined between two parallel legs 14.

As best shown in FIG. 1 and in the rear view of FIG. 2, a fixed crossbar 15 joins the outer ends of the legs 14. Reference numeral 16 generally indicates an electric motor and cutter unit mounted for vertical movement with respect to the tool body 12 by means of a slideable back plate 17 in a manner to be described hereafter.

A pair of guide and support arms 20 are pivotally attached to the tool body 12 by shoulder bolts 21 as shown in FIG. 2. Each of the guide and support arms 20 has a pair of rollers 22 and 23 adapted to pinch the wall of a pipe therebetween, the support roller 22 being the inner roller of the pair and the guide roller 23 being the outer roller. The guide roller 23 is spring loaded (as will be explained in greater detail in conjunction with FIG. 4) to accommodate any unevenness of the wall of a pipe being machined. As clearly shown in FIGS. 1 and 2, the arms 20 are disposed at equal angles with respect to the motor and cutter unit 16 when a pipe 11 is in position for grooving. It will also be noted that the arms 20 both point toward the longitudinal axis of the pipe 11. A pair of arcuate slots 24 through the tool body 12 serve as guides for the inner ends of the arms 20.

The elements 25 of FIG. 1 are bar-like end stops against which the end of the pipe 11 abuts when the tool 10 is in operative position. The end stops 25 project outwardly toward the viewer in the front view of FIG. 1. Also shown in FIGS. 1 and 2 are a pair of handles 26 extending out from the tool body 12. The handles 26 are preferably formed with suitable grips to be grasped by the hands of the operator of the tool 10.

A section of the pipe 11 is shown cut away at 27 in FIG. 1, to show a typical groove of the kind produced by the tool of the invention by rotation of the tool 10 around the pipe 11.

Referring now to the rear view of the tool shown in FIG. 2, the vertically adjustable back plate 17 is seen to be fitted within the channel 13 of the tool body 12. The back plate 17 is shaped somewhat like the capital letter H, with a crosspiece 30 lying parallel to the crossbar 15 of the tool body 12. As shown in FIG. 2 and in the sectional view of FIG. 5, a cylindrical rod 31 passes through an unthreaded bore hole 15a in the center of the crossbar 15 and the threaded hole 33 in crosspiece 30. The rod 31 is threaded along a considerable portion of its length, and the threads 32 of the rod engage cooperating threads provided in the bore hole 33 of the crosspiece 30. Thus by rotating the rod 31 the back plate 17 may be adjusted vertically with respect to the tool body 12. A knob 34 is provided on the outer end of the rod 31 for manual turning of the rod to adjust the vertical position of the back plate 17. A helical spring 35, normally under compression, surrounds the adjustment rod 31 between the crossbar 15 and the crosspiece 30 allowing some upward movement to compensate for irregularities in the pipe being grooved. The inner end of the rod 31 is widened by a stop element 36 to prevent accidental complete unscrewing of the rod 31 from the crosspiece 30, and to set a lower limit to vertical adjustment.

Preferably the upper portions 37 of the vertical legs of the H-shaped back plate are thinner than the lower portions 38 of the vertical legs as shown in FIG. 2. The upper portions 37 set a limit to upward adjustment of the back plate 17 at the point at which they abut against the crossbar 15. As best shown in FIGS. 3 and 7 the back plate 17 is formed with outwardly projecting tongues 41 extending along its leg portions 37 and 38 to slideably interfit with vertically extending grooves 42 provided along the vertical sides of the channel 13 in the tool body 12, to guide the back plate 17 when a vertical adjustment is made.

Referring now to FIGS. 3 and 5, it will be seen that the back plate 17 forms part of a mounting arrangement for the motor-cutter unit 16 which allows adjustment in two mutually perpendicular directions. The direction of adjustment through sliding motion of the platform 17 has been referred to as "vertical" for convenience, since the tool 10 may be considered to be in its upright position in FIGS. 1 and 2. Because the usual procedure in cutting a groove is to rotate the tool of the invention around a pipe, the term "vertical" is actually used to describe a direction perpendicular to the pipe surface on a line passing through the axis of the pipe. The term "horizontal" as used herein is intended to indicate a direction generally parallel to the longitudinal axis of a pipe to be grooved.

FIG. 5 shows that the crosspiece 30 of the back plate 17 is actually an integral part of a generally rectangular shelf or platform 43 upon which the motor and cutter unit is mounted. The platform 43 is shown in some detail in FIGS. 5 and 7, which figures also show the manner in which horizontal adjustment is effected. The platform 43 extends perpendicularly outward from the tool body 12 so that it overlies the end of a pipe 11 in position for grooving as shown in FIG. 5.

The side edges 44 of the platform 43 are return bent as shown in the sectional view of FIG. 6 to form horizontal grooves or tracks 45 in which the side edges 47 of a rectangular panel 48 are slidably fitted for horizontal sliding adjustment. The panel 48 is secured to a housing 49 of the motor and cutter unit 16 as illustrated in FIG. 5.

The platform 43 has a large central opening 53 shown best in FIGS. 5 and 7. Although the opening 53 is shown as circular in shape it could be of some other suitable contour. The panel 48 also has a central opening 54 through which the shaft 55 of a cutter 56 extends downwardly. In any operative adjusted position of the panel 48 the shaft 55 will also extend through the opening 53 in the platform 43 so that the cutter 56 can be turned freely against a pipe surface. It will be understood that suitable clearance will be allowed for the shaft 55, since the shaft 55 will be rotated by a high speed electric motor 57 mounted vertically with the housing 49. It will be understood that a power cable (not illustrated) would be provided to connect the motor 57 to a suitable source of electric power, and that a switch would be provided for turning the motor off and on.

The cutter 56 may be of the type known as a straight router cutter, and is secured to the motor shaft 55 by a suitable collet. Such a cutter is adapted to produce a perpendicular, flat bottomed groove. Of course if some other type of groove were desired it would be obvious to those skilled in the art to substitute some other type of cutter.

The mechanism for fine adjustment of the horizontal position of the panel 48, and hence the position of the cutter 56 with respect to the end plane of a pipe 11, is shown in FIGS. 5 and 7 to include composite screw 60. The screw 60 has a forwardly extending portion 61 received in a threaded bore hole 62 formed in the panel 48, and a rear portion 63 passing through a threaded aperture 64 formed through the crosspiece 30 of the platform 43. The threads of the crew portions 61 and 63 are of the same hand but of different pitches, as are the complementary threads of the aligned holes 62 and 64. Thus when the screw 60 is turned, as by insertion of a tool in its end slot 65, a differential adjusting action of the position of the panel 48 is obtained. This permits the position of the cutter 56 to be set with great accuracy with respect to the end of the pipe. A locking nut 66 is provided to lock the screw in the selected position.

The guide and support arms 20 of the tool 10 are situated in symmetrical positions in front of the tool body 12 as shown in FIGS. 1 and 3 for engaging and rotatably holding a pipe to be grooved. FIG. 4 shows one of the arms 20 in cross section, mounted on the tool body 12 by the rotatable shoulder bolt 21, the head of which is flush mounted in a recess in the rear of the tool body 12. Since both arms 20 are of identical construction the following description applies to both arms.

Reverting now to FIG. 4, it can be seen that a flat portion 69 of the arm 20 lies adjacent the tool body 12. A support projection 70 extends perpendicularly forward from the arm portion 69 and serves as a mounting for the support roller 22 which is rotatably mounted on an axle 71, the ends of which are seated in apertures 72 and 73 formed in inner and outer walls of a transverse channel 74 located near the forward end of the support projection 70. The roller is so mounted as to have its bearing surface protruding out of the mouth of the channel 74 to engage the inner wall of a pipe as show.

It will be clear from the showing of FIG. 4 that the support roller 22 may appropriately be approximately aligned with the shoulder bolt 21 about which the arm 20 pivots for adjustment.

The guide roller 23 is held in a position opposed to that of the support roller 22 by an adjustable guide assembly 75 best seen in FIG. 4. The assembly 75 is mounted on the flat arm portion 69 by an angled forwardly extending arm portion 76, and includes an elongated box-like housing 77 which is open toward the roller 22. It will be clear from FIG. 4 that the pipe wall is readily received between the rollers 22 and 23 and in the space between the projection 70 and the angled arm portion 76. The housing 77 and arm portion 76 may be integrally formed with the arm portion 69 and the projection 70, if desired.

The housing 77 has its longest dimension aligned with the arm portion 69. A piston-like element 80 is mounted slidably within the housing 77 for movement toward and away from the wall of a pipe supported on the roller 22. The element 80 has two parallel side pieces 81, slidably engaging opposed walls of the housing 77, as well as two transverse webs 82 and 83. Near their inner ends the side pieces 81 are formed with apertures 84 and 85 which receive the ends of an axle 86 of the guide roller 23.

The transverse web 83 is essentially a brace, but the web 82 is operatively engaged with a nut 87 threaded on the inner portion of an adjusting rod 90.

The adjusting rod 90 extends centrally through the housing 77 and passes through a central hole in the end wall 91 of the housing 77, the outer end 92 of the rod 90 being secured to a normally rotatable adjustment knob 93. A coiled spring 94 surrounds the shank of the rod 90 within the housing 77 between the end wall 91 and the web 82 to allow some compensating motion. By turning the knob 93 the piston like element is advanced or retracted to bring the roller 23 into the desired position with respect to the roller 22.

The axles 71 and 86 are at an angle with the axis of the pipe in the horizontal plane, but are parallel to the axis of the pipe in the vertical plane. This arrangement causes the tool to track against the pipe end. When the opposed rollers 22 and 23 are brought into their adjusted position engaging opposite sides of a pipe wall, this relative inclination constantly urges the pipe end toward the tool body 12 and thus prevents slippage of the pipe away from the tool as it rotates. Of course the end stops 25 prevents any inward motion once the pipe is in position, as best seen in FIG. 3.

The flat portion 69 of the arm 20 has an extension 95 remote from the angled portion 76 to which a bolt 96 is firmly secured. The bolt 96 extends rearward through the aforementioned curved slot 24 in the tool body 12 to terminate in a locking nut 97, which may have a suitable washer as shown in FIGS. 2 and 4. As the arm 20 is moved to the proper angular position the bolt 96 rides in the slot 24.

Another feature important to the accurate adjustment of the tool 10 is the depth stop 100 shown best in FIG. 5. The depth stop 100 is mounted to move with the platform 43 upon vertical adjustment by means of the adjusting mechanism described above. When the depth stop 100 has been set in a selected position its relationship with the cutter 56 is fixed. Thus, as shown in FIG. 5, the depth stop may be set to engage the outer surface of the pipe 11 when the cutter 56 has cut into the surface of the pipe 11 to the desired groove depth. Once the depth stop 100 has come into abutment with the pipe surface the cutter 56 will cut only to the desired groove depth.

The depth stop 100 is adjustably mounted in a recess 101 formed in a downwardly extending projection 102 of the platform 43. The projection 102 may also provide a third end stop in cooperation with the end stops 25. As shown in FIG. 5 the depth stop 100 is a rod or bar mounted for vertical movement within the recess 101 upon rotation of a double-threaded screw 103. The screw 103 is generally similar to the larger horizontal adjustment screw 60, in that its lower portion 104 has threads of a different pitch than those of its upper portion 105, upon which the depth stop 100 is threadedly mounted. A locking nut 106 is threaded on the lower end of the screw 103 for firmly locking the depth stop 100 at the desired position.

A further advantageous feature of the tool 10 is the provision of chip wipers 107 in the form of strips of flexible material suitably secured to downwardly extending legs 108 of the platform 43 as shown in FIGS. 1, 5, 8, and 9. The purpose of the chip wipers 107 is to remove plastic chips cut from the pipe 11 by the cutter 56, so that the ships will not interfere with the rotation of the tool 10 or the operation of the cutter 56. Of course, the high speed motor 57 will produce a draft of air as it runs, also serving to blow away chips of plastic.

The mode of operation of the tool 10 in grooving pipes of different diameters will be apparent from FIGS. 1, 8, and 9. The location of the groove to be cut is fixed by setting the horizontal position of the platform 43 by means of the adjusting screw 60, and the locking nut 66 is tightened at the desired position. This setting fixes the distance of the groove from the pipe end in a simple manner, and there is no need to adjust several end stops. The depth stop 100 is quickly set for the desired groove depth by turning the depth stop adjusting screw 100. The platform 43 is raised to an elevated position by turning the know 34 to allow the pipe end to be brought beneath the cutter 56.

The self centering guide and support arms 20 are unlocked by loosening their single locking nuts 97, allowing the bolts 96 to ride freely in their slots 24. The guide rollers 23 are backed away from the support rollers 22 by manual turning of the knobs 93. The pipe end is then inserted between the pairs of rollers 22 and 23, until the end abuts the end stops 25.

Leaving the arms 20 free to move radially by leaving the nuts 97 loose, the rollers 23 are advanced to engage the outer wall of the pipe. The guide rollers 23 will roll along the pipe wall until the arms 20 reach a position perpendicular to the pipe wall at the point of contact with the rollers 22 and 23 as shown in FIGS. 1, 8, and 9. This position is that at which the arms 20 point inwardly toward the longitudinal axis of the pipe. As clearly shown in FIGS. 8 and 9, a pipe 111 of large diameter, say 2 feet or larger, or a pipe 121 of small diameter, perhaps 8 inches or less, may be accommodated by the arms 20 of the tool.

The locking nuts 97 are tightened when the rollers 22 and 23 are firmly pinching the pipe wall therebetween. The motor 57 is turned on and the cutter 56 is then brought into contact with the pipe by lowering the platform 43, through manual turning of the knob 34. The cutter 56 cuts into the pipe wall and the platform 43 is lowered further until the depth stop 100 engages the pipe wall. Then the vertical adjustment has been set. Because of the spring loading of the vertical adjustment rod 31 and of the guide rollers 23, irregularities in the thickness of the pipe wall, or in the roundness of the pipe, cause no problem. The rollers 23 and the platform 43 are free to move upward to accommodate such irregularities, without stopping the grooving operation. One complete rotation of the tool 10 around the pipe by an operator grasping the handles 26 produces the desired groove. Backing up on the knobs 34 and 93 releases the grooved pipe. Another pipe of the same dimensions can be grooved immediately, or adjustments can be made for a different type of pipe or groove.

The preferred embodiment and mode of operation described are not intended to limit the scope of the invention to the details given, but are merely illustrative. Numerous modifications and changes will suggest themselves to those skilled in the art, as will other uses of the tool of the invention.

Thus, for example, a different type of cutter might be employed to produce a rounded or V-shaped groove. The location or number of handles might be varied, say by adding a third handle perpendicular to the handles 26 shown, if desired.

Another modification which might have certain advantages, particularly if pipes of small dimension, and therefore greater resistance to stress were to be grooved, would be the relocation of the arms 20 to positions diametrically opposite to those shown, i.e., beneath the pipe and further from the cutter 56. Since it is advantageous to give firm support to the wall of the pipe of large diameter, the preferred embodiment has the support rollers 22 close to the cutter 56. This is advantageous in view of the torque generated in the pipe by the high speed rotation of the cutter 56 in cutting the plastic material of the pipe wall, which may be quite tough.

In using the tool of the invention it might be desirable to keep the tool in one position and rotate the pipe. Or it might even be desired to have more than one cutter to produce parallel grooves in one rotation.

Other modifications and substitutions will be obvious from the foregoing description of the invention, which provides a new and advantageous tool for machining pipe.

What is claimed is:

1. A tool for forming an annular groove around a pipe, comprising a tool body, guide and support means mounted on the tool body for rotatably engaging a pipe, said guide and support means including rollers adapted to engage the inner and outer walls of a pipe, cutting means, and means for adjustably positioning the cutting means with respect to the tool body to cut a groove of the desired depth and at a selected location near the end of the pipe.

2. A tool for forming an annular groove around a pipe, comprising a tool body, guide and support means mounted on the tool body for rotatably engaging a pipe, said quide and support means comprising a pair of arms adjustably mounted on the tool body, each of said arms having a pair of rollers for engaging a pipe wall therebetween, cutting means, and means for adjustably positioning the cutting means with respect to the tool body to cut a groove of the desired depth and at a selected location of the pipe.

3. The tool of claim 1, wherein said guide and support means includes a pair of arms mounted on said tool body, means for adjusting the position of said arms, said rollers being mounted on said arms for engaging the inner and outer walls of a pipe.

4. The tool of claim 1, wherein the cutting means includes a motor driven cutter, and wherein the means for adjustably positioning the cutting means comprises an adjustable platform mounted on the tool body, said platform supporting said motor driven cutter.

5. The tool according to claim 1 and including a motor driven cutter, the tool body having fixed pipe end stops, said guide and support means being adapted for rotatably securing the tool to a pipe for rotation of the tool around the pipe, said motor driven cutter being mounted on said tool body by means allowing adjustment of the cutter in two directions with respect to the tool body.

6. The tool of claim 5, wherein said motor driven cutter is mounted on a platform for adjustment toward or away from the axis of a pipe to which the tool is rotatably secured.

7. The tool of claim 6, wherein said motor driven cutter is adjustably mounted for movement with respect to said platform in a direction generally parallel to the axis of a pipe to which the tool is rotatably secured.

8. A tool for forming an annular groove around a pipe, comprising a motor driven cutter, a tool body with fixed pipe end stops, means for rotatably securing the tool to a pipe for rotation of the tool around the pipe, said means for rotatably securing the tool to a pipe including a pair of guide and support arms, each arm of said pair having a pair of opposed rollers for engaging the inner and outer wall of a pipe, said motor driven cutter being mounted on said tool body by means allowing adjustment of the cutter in two directions with respect to the tool body.

9. The tool of claim 8, wherein one roller of each pair of rollers is mounted for movement toward and away from the other roller of the pair of rollers.

10. A tool for forming an annular groove about a pipe including a motor driven cutter, a tool body, means for securing the tool to a pipe for rotation around the pipe, said securing means including at least one arm adjustably mounted on the tool body, said arm having a pair of opposed rollers for engaging a pipe wall therebetween, adjustable platform means mounted on said tool body for motion toward and away from the axis of the pipe, said motor driven cutter being mounted on said platform means for movement therewith, and an adjustable depth stop mounted on said platform for setting the depth of a groove to be cut.

11. The tool od claim 10, wherein said rollers constitute guide and support means for maintaining the cutter aligned toward the axis of a pipe to be cut.

12. The tool of claim 10, wherein the guide and support means are adjustable for operation of the tool with pipes of different sizes.

* * * * *